J. CALDWELL.
VEGETABLE CUTTER.
No. 73,775. Patented Jan. 28, 1868.
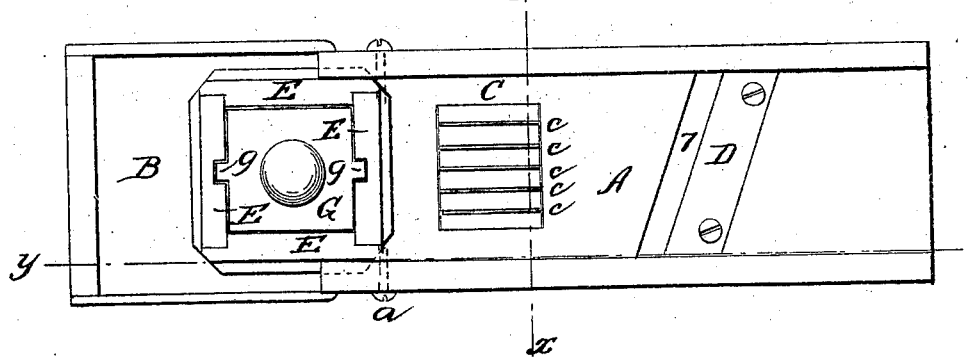
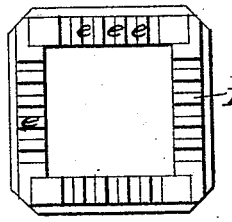
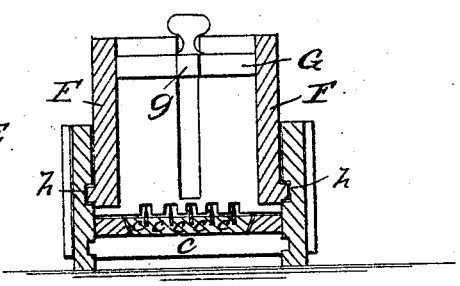
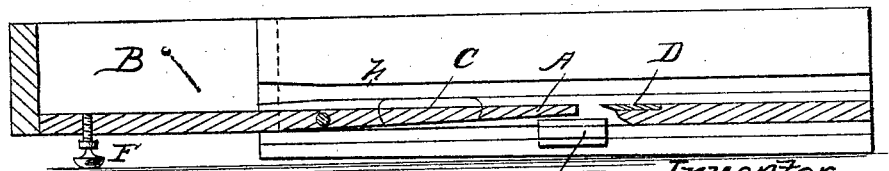
Witnesses:
Theo Tusche
Wm Trewin
Inventor:
J. Caldwell
Per Munn & Co
Attorneys

United States Patent Office.

J. CALDWELL, OF CHILLICOTHE, OHIO.

Letters Patent No. 73,775, dated January 28, 1868.

IMPROVED VEGETABLE-CUTTER.

*The Schedule referred to in these Letters Patent and making part of the same.*

TO ALL WHOM IT MAY CONCERN:

Be it known that I, J. CALDWELL, of Chillicothe, in the county of Ross, and State of Ohio, have invented a new and improved Vegetable-Cutter; and I do hereby declare that the following is a full, clear, and exact description thereof, which will enable others skilled in the art to make and use the same, reference being had to the accompanying drawings, forming part of this specification.

This invention relates to an improved vegetable-cutter, and consists in an improvement on my invention patented the 22d day of August, 1865. The rear of the platform, described in the specification to my said patent, being extended, and the block carrying the small blades, inserted in the bottom of the platform, being so arranged that a box, carrying the vegetable to be cut, and the bottom of its wall furnished with slits or grooves, to allow the passage of the knives, can be run over the small knife-block and returned as often as desired before passing to the cross-knife. In the accompanying drawings—

Figure 1 is a top view of my improved vegetable-cutter.

Figure 2 is a transverse section at line $x\,x$, showing the box over the knives.

Figure 3 is a longitudinal section thereof, at line $y\,y$; and

Figure 4 is a bottom view of the vegetable-box.

Similar letters of reference indicate like parts.

A A are the platform, and B the extension thereof, at the rear. C is a block, removable at pleasure, carrying the knives $c\,c\,c$, adjusted at such a distance from the cross-knife D that the box E, carrying the vegetable to be cut, may pass over the block C, be drawn back to the rear thereof, turned and run over C, as often as may be desired, before feeding to the cross-knife D. The walls E of the vegetable-box are provided with grooves $e$, through which the small knives $c$ of block C pass to the vegetable in box E, as the latter is moved down the grooves $h$, inside of platform. The lid G sliding in grooves $g$ in box E, presses down the vegetable to the knives. The set-screw F serves to steady the platform A, pivoted at $a$, according to the position in the bottom groove to which the adjusting-slide G' is set.

What I claim as new, and desire to secure by Letters Patent, is—

1. The rear extension B, in combination with the platform A and horizontal knife D, substantially as herein set forth and described.

2. The box E, provided with the grooves $e$ in the bottoms of its walls, substantially as herein shown and described.

J. CALDWELL.

Witnesses
H. GARDNER,
A. HOLLISTER.